(12) United States Patent
Lu et al.

(10) Patent No.: US 12,292,168 B2
(45) Date of Patent: *May 6, 2025

(54) MODULARIZED LIGHTING DEVICE

(71) Applicant: Shinegrow (Xiamen) Lighting Technology Co., LTD., Fujian (CN)

(72) Inventors: Fuxing Lu, Fujian (CN); Honggang Sun, Fujian (CN)

(73) Assignee: Shinegrow (Xiamen) Lighting Technology Co., LTD., Fujian (CN)

( * ) Notice: Subject to any disclaimer, the term of this patent is extended or adjusted under 35 U.S.C. 154(b) by 37 days.

This patent is subject to a terminal disclaimer.

(21) Appl. No.: 18/122,102

(22) Filed: Mar. 15, 2023

(65) Prior Publication Data

US 2024/0060608 A1    Feb. 22, 2024

(30) Foreign Application Priority Data

Aug. 19, 2022 (CN) .......................... 202222195272.4
Aug. 19, 2022 (CN) .......................... 202222197514.3

(51) Int. Cl.

| | |
|---|---|
| *F21S 2/00* | (2016.01) |
| *A01G 9/24* | (2006.01) |
| *F21K 9/272* | (2016.01) |
| *F21S 4/28* | (2016.01) |
| *F21S 8/06* | (2006.01) |

(Continued)

(52) U.S. Cl.
CPC .............. *F21S 2/005* (2013.01); *F21K 9/272* (2016.08); *F21S 4/28* (2016.01); *F21V 15/015* (2013.01); *F21V 19/003* (2013.01); *F21V 19/004* (2013.01); *F21V 21/008* (2013.01); *F21V 21/22* (2013.01); *F21V 23/06* (2013.01); *F21V 31/005* (2013.01); *A01G 9/249* (2019.05); *F21S 8/061* (2013.01); *F21V 21/005* (2013.01); *F21Y 2103/10* (2016.08); *F21Y 2105/10* (2016.08); *F21Y 2115/10* (2016.08)

(58) Field of Classification Search
CPC ...... F21S 2/00; F21S 2/005; F21S 4/20; F21S 4/28; F21S 8/061; F21K 9/272; F21K 9/275; F21V 19/004; F21V 21/005; F21V 23/06; F21V 31/005; F21V 8/061; F21V 19/003; F21Y 2105/10; F21Y 2103/10; A01G 9/249

See application file for complete search history.

(56) References Cited

U.S. PATENT DOCUMENTS

| | | | |
|---|---|---|---|
| 2012/0099318 A1* | 4/2012 | Liu | F21V 23/001 |
| | | | 362/249.02 |
| 2014/0286004 A1* | 9/2014 | Su | F21V 23/06 |
| | | | 362/221 |
| 2019/0234564 A1* | 8/2019 | Han | F21V 23/06 |

* cited by examiner

*Primary Examiner* — Alan B Cariaso
(74) *Attorney, Agent, or Firm* — Winston Hsu

(57) ABSTRACT

A modularized lighting device includes a light source module and a frame. The light source module includes a housing and two end caps disposed at the two ends of the housing respectively. Each of the end caps includes a base having an accommodating space and two connecting sheets fixed at the bottom of the accommodating space. The frame includes two electrical connecting modules. Each of the electrical connecting modules includes an installation base having an installation space and two clamping structures disposed at the bottom of the installation space. The two end caps are detachably installed at the two electrical connecting modules respectively, such that the two connecting sheets of each of the end caps are inserted into the two clamping structures of the electrical connecting module corresponding thereto.

7 Claims, 9 Drawing Sheets

(51) Int. Cl.
*F21V 15/015* (2006.01)
*F21V 19/00* (2006.01)
*F21V 21/005* (2006.01)
*F21V 21/008* (2006.01)
*F21V 21/22* (2006.01)
*F21V 23/06* (2006.01)
*F21V 31/00* (2006.01)
*F21Y 103/10* (2016.01)
*F21Y 105/10* (2016.01)
*F21Y 115/10* (2016.01)

MODULARIZED LIGHTING DEVICE

BACKGROUND OF THE INVENTION

1. Field of the Invention

The present invention relates to a lighting device, in particular to a modularized lighting device.

2. Description of the Prior Art

Most of currently available lighting products are integrated-type lighting devices. If a currently available lighting device malfunctions, it is necessary to replace the lighting device by another one or remove lighting device for repairing. For the same reason, the transportation cost and storage cost of these lighting devices cannot be effectively reduced.

In addition, the brightness of these integrated-type lighting devices cannot be adjusted. Therefore, if the user needs higher brightness, the user needs to install more lighting devices, which is not flexible in use. Besides, the application of these lighting devices is also limited.

SUMMARY OF THE INVENTION

One embodiment of the present invention provides a modularized lighting device includes a light source module and a frame. The light source module includes a housing and two end caps disposed at the two ends of the housing respectively. Each of the end caps includes a base having an accommodating space and two connecting sheets fixed at the bottom of the accommodating space. The frame includes two electrical connecting modules. Each of the electrical connecting modules includes an installation base having an installation space and two clamping structures disposed at the bottom of the installation space. The two end caps are detachably installed at the two electrical connecting modules respectively, such that the two connecting sheets of each of the end caps are inserted into the two clamping structures of the electrical connecting module corresponding thereto.

In one embodiment, each of the end caps further includes a water-proof ring disposed at the bottom of the accommodating space and surrounds the two connecting sheets.

In one embodiment, the modularized lighting device further includes a light source board disposed in the housing and the two connecting sheets are electrically connected to the light source board via the base.

In one embodiment, the modularized lighting device further includes a light source module disposed in the frame and electrically connected to the two clamping structures of each of the electrical connecting modules.

In one embodiment, the light source board includes a circuit board and a plurality of light emitting units disposed on the circuit board.

In one embodiment, the light emitting units are light-emitting diodes (LED).

In one embodiment, the frame further includes a first frame bar, a second frame bar and a connecting portion. The first frame bar is connected to the second frame bar via the connecting portion, and the two electrical connecting modules are disposed on the first frame bar and the second frame bar respectively.

In one embodiment, the modularized lighting device includes a power source module disposed in the connecting portion and electrically connected to the clamping structures of each of the electrical connecting module.

In one embodiment, the modularized lighting device further includes a hanging structure. The hanging structure has a retractable structure, two first hanging rings fixed on the first frame bar and two second hanging rings fixed on the second frame bar. The retractable structure is connected to the two first hanging rings and the two second hanging rings.

In one embodiment, each of the end caps further includes two snapping mechanisms disposed at two sides of the base respectively. The end cap is detachably installed on the electrical connecting module corresponding thereto via the two snapping mechanisms.

The modularized lighting device in accordance with the embodiments of the present invention may have the following advantages:

(1) In one embodiment of the present invention, the modularized lighting device has the modularized light source module and the modularized electrical connecting module. Thus, if any one of the light source modules or any one of the electrical connecting module malfunctions, the user can directly remove the light source module or electrical connecting module for maintenance or repairing, which can significantly reduce the maintenance cost.

(2) In one embodiment of the present invention, the modularized lighting device has the modularized light source module and the modularized electrical connecting module. Therefore, the modularized lighting device is not only convenient in transportation, but also can effectively save more storage space, which can greatly reduce the transportation cost and storage cost thereof.

(3) In one embodiment of the present invention, the modularized lighting device has the expandable structure, so the user can increase the number of the lighting source modules via the expandable structure according to actual requirements. Therefore, the luminance and the lighting range of the modularized lighting device can satisfy the requirements of the user. Therefore, the modularized lighting device can be more flexible in use and more comprehensive in application.

(4) In one embodiment of the present invention, the structure design of the modularized lighting device is simple, so the modularized lighting device can achieve the desired technical effects without significantly increasing the cost thereof. Thus, the modularized lighting device can have high commercial value.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

The present invention will become more fully understood from the detailed description given herein below and the accompanying drawings which are given by way of illustration only, and thus are not limitative of the present invention and wherein.

DETAILED DESCRIPTION

Figure 1:
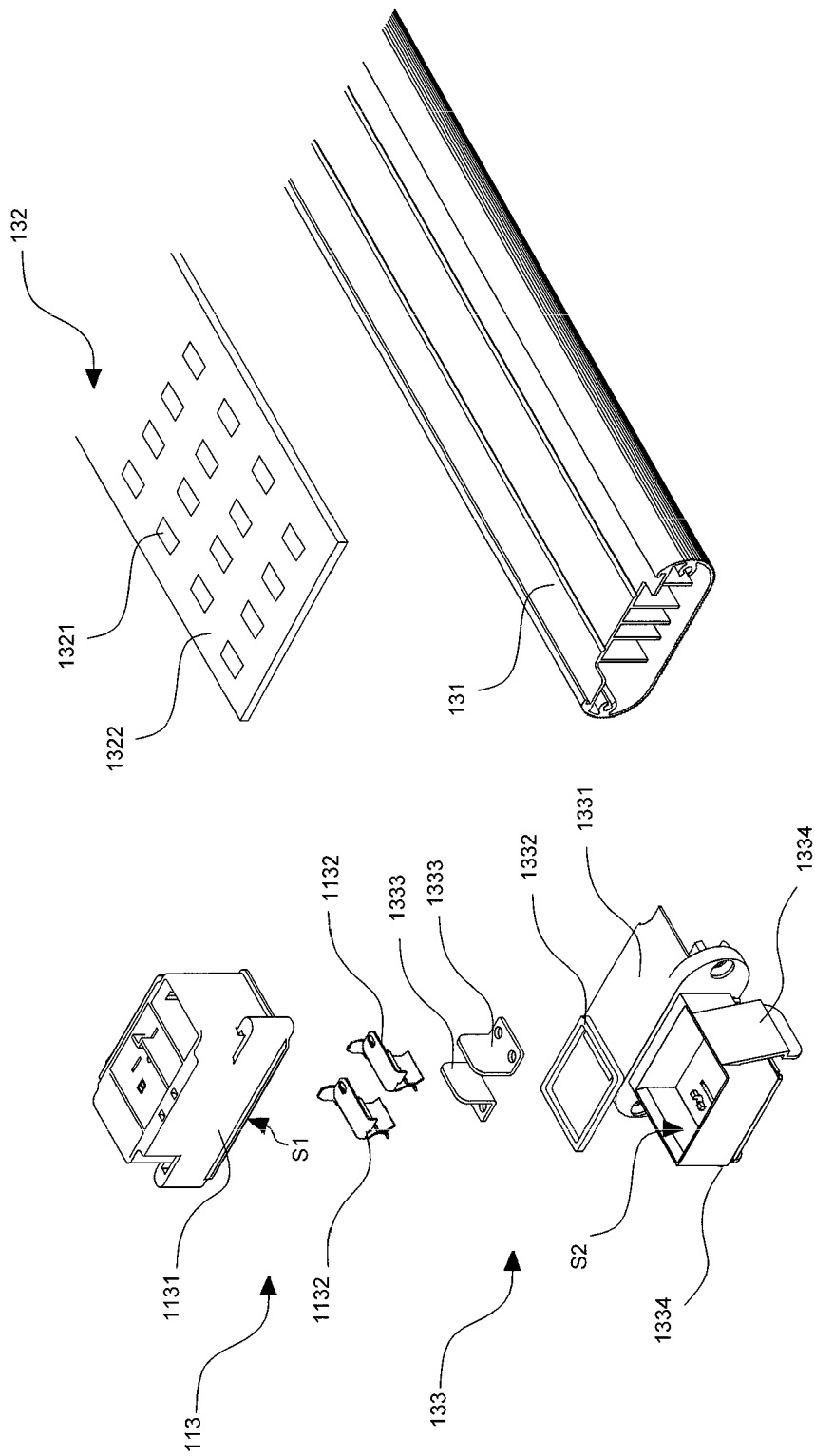
FIG. 1 is an exploded view of a modularized lighting device in accordance with one embodiment of the present invention.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing. It should be understood that, when it is described that an element is "coupled" or "connected" to another element, the element may be "directly coupled" or "directly connected" to the other element or "coupled" or "connected" to the other element through a third element. In contrast, it should be understood that, when it is described that an element is "directly coupled" or "directly connected" to another element, there are no intervening elements.

Figure 2:
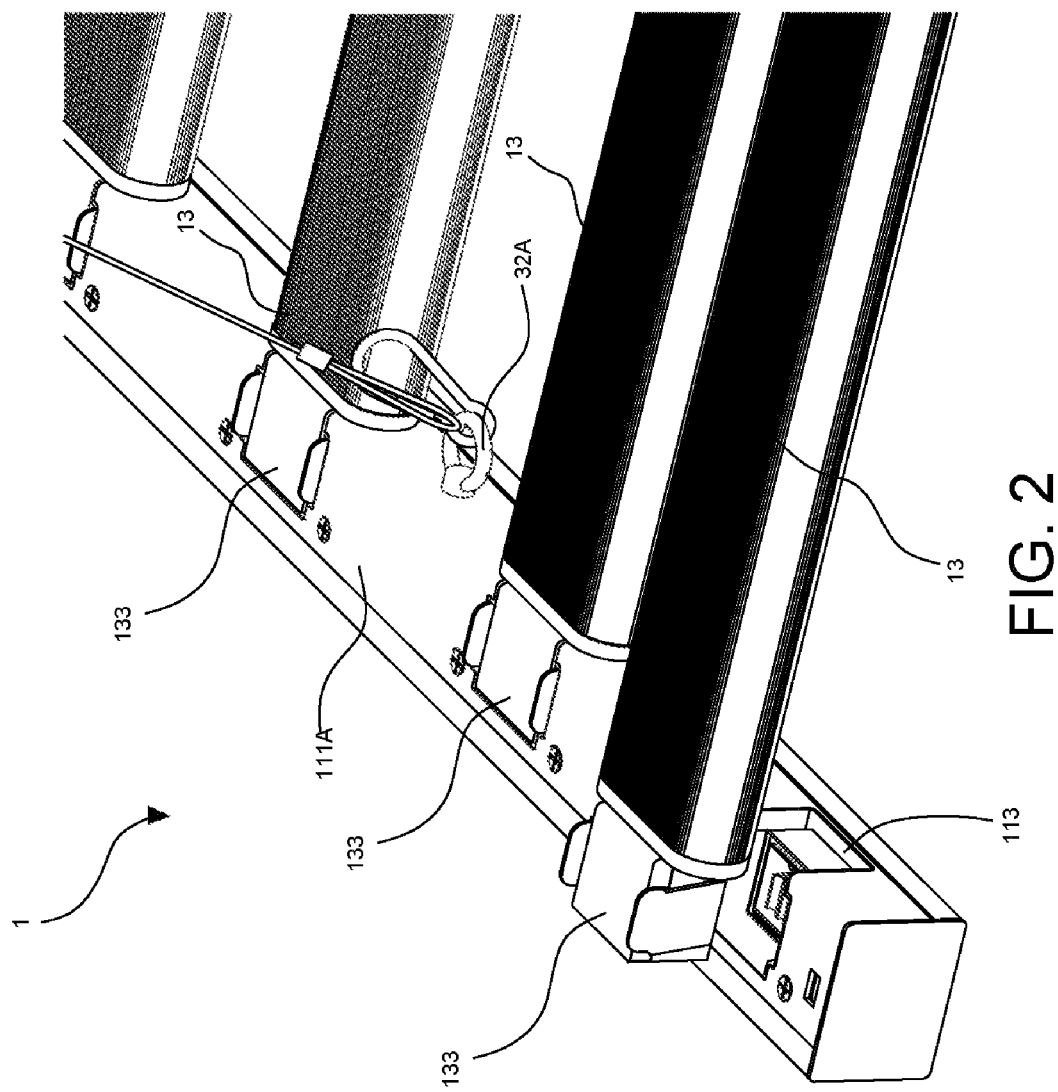
FIG. 2 is a partial enlargement view of the modularized lighting device in accordance with one embodiment of the present invention.
Figure 3:
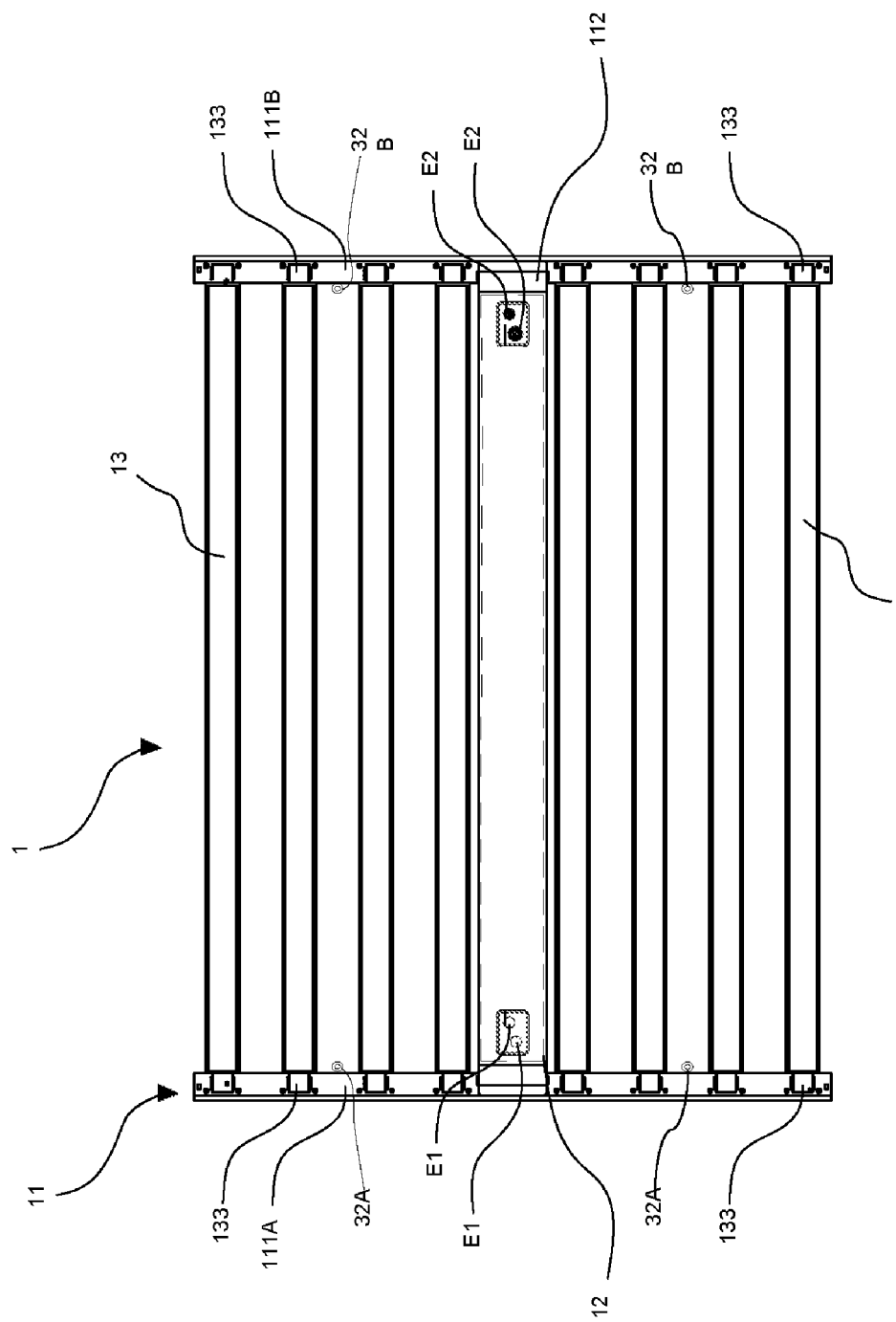
FIG. 3 is a top view of the modularized lighting device in accordance with one embodiment of the present invention.

Please refer to FIG. 1, FIG. 2 and FIG. 3. FIG. 1 is an exploded view of a modularized lighting device in accordance with one embodiment of the present invention. FIG. 2 is a partial enlargement view of the modularized lighting device in accordance with one embodiment of the present invention. FIG. 3 is a top view of the modularized lighting device in accordance with one embodiment of the present invention. As shown in FIG. 1, FIG. 2 and FIG. 3, the modularized lighting device 1 includes a frame 11, a power source module 12 and a plurality of light source modules 13.

The frame 11 includes a first frame bar 111A, a second frame bar 111B, a connecting portion 112 and a plurality of electrical connecting modules 113. The first frame bar 111A is connected to the second frame bar 111B via the connecting portion 112. In one embodiment, the frame 11 may be made of a non-metallic material, such as plastics. In another embodiment, the frame 11 may be made of a metal material, such as aluminum, copper, stainless steel, etc. The above electrical connecting modules 113 are detachably disposed at the first frame bar 111A and the second frame bar 111B. Each electrical connecting module 113 includes an installation base 1131 and two clamping structures 1132. The installation base 1131 has an installation space S1 and the two clamping structures 1132 are disposed at the bottom of the installation space S1. As set forth above, the electrical connecting structure 113 has a modularized structure.

The above light source module 13 may be a modularized light source module. One end of each of the light source modules 13 is fixed at the first frame bar 111A and the other end thereof is fixed at the second frame bar 111B, such that the light source modules 13 are parallel to each other. The above light source modules 13 may be detachably fixed at the first frame bar 111A and the second frame bar 111B. In this way, the light source modules 13 can be disposed in the frame 11.

Each light source module 13 includes a housing 131, a light source board 132 and two end caps 133. The light source board 132 is disposed in the housing 131. The light source board 132 includes a plurality of light-emitting units 1321 and a circuit board 1322. The light-emitting units 1321 are disposed on the circuit board 1322. In one embodiment, the light-emitting units 1321 may be light-emitting diodes (LED) or other currently available light sources.

The two end caps 133 are disposed at the two ends of the housing 131 respectively. Each of the end caps 133 includes a base 1331, a water-proof ring 1332, two connecting sheets 1333 and two snapping mechanisms (e.g., snap-fit hooks, snap arms, etc.) 1334. The base 1331 has an accommodating space S2. The two connecting sheets 1333 are fixed at the bottom of the accommodating space S2 and electrically connected to the light source board 132 via the base 1331. The water-proof ring 1332 is disposed at the bottom of the accommodating space S2 and surrounds the two connecting sheets 1333. The two end caps 133 of each light source module 13 are detachably installed on one of the electrical connecting modules 113 of the first frame bar 111A and one of the electrical connecting modules 113 of the second frame bar 111B respectively. The two connecting sheets 1333 of each end cap 133 are respectively inserted into the two clamping structures 1132 of the electrical connecting module 113 corresponding thereto. In this way, the light source module 13 can be electrically connected to the two clamping structures 1132 of the electrical connecting module 113 corresponding thereto. The connecting sheets 1333 may be made of a conductive material (e.g., aluminum, copper, phosphor bronze or other metal materials), so the connecting sheets 1333 can have great elasticity and electrical conductivity. The two snapping mechanisms 1334 are disposed at the two sides of the base 1331, such that the end cap 133 can be fixed at the electrical connecting module 113. If the user would like to replace one of the light source modules 13, the user can remove the end caps 133 of the light source module 13 by pressing the two snapping mechanisms 1334 of each of the end caps 133. Afterward, the user can install the two end caps 133 of another light source module 13 on the two electrical connecting modules 113 corresponding thereto, and then press the light source module 13 in the direction toward the two electrical connecting modules 113. Thus, this light source module 13 can be detachably fixed at the two electrical connecting modules 113 via the two snapping mechanisms 1334.

The power source module 12 is disposed in the frame 11 and electrically connected to the two clamping structures 1132 of each of the electrical connecting modules 113. In this embodiment, the power source module 12 is disposed in the connecting portion 112. In one embodiment, the power source module 12 may include one or more of a filter circuit, a rectifier circuit, a transformer circuit and a converter circuit. Via the above structure, the light source board 122 can be electrically connected to the power source module 12 via the base 1331, the two connecting sheets 1333 and the electrical connecting modules 113 (the two clamping structures 1132).

The modularized lighting device 1 has the modularized light source modules 13 and electrical connecting modules 113. Thus, if any one of the power source modules 13 or any one of the electrical connecting modules 113 malfunctions, the user can directly remove the light source module 13 or electrical connecting module 113 for maintenance or repairing. In addition, via the above structure design, the modularized lighting device 1 is not only convenient in transportation, but also can effectively save more storage space, which can greatly reduce the transportation cost and storage cost thereof.

The embodiment just exemplifies the present invention and is not intended to limit the scope of the present invention; any equivalent modification and variation according to the spirit of the present invention is to be also included within the scope of the following claims and their equivalents.

Figure 4:
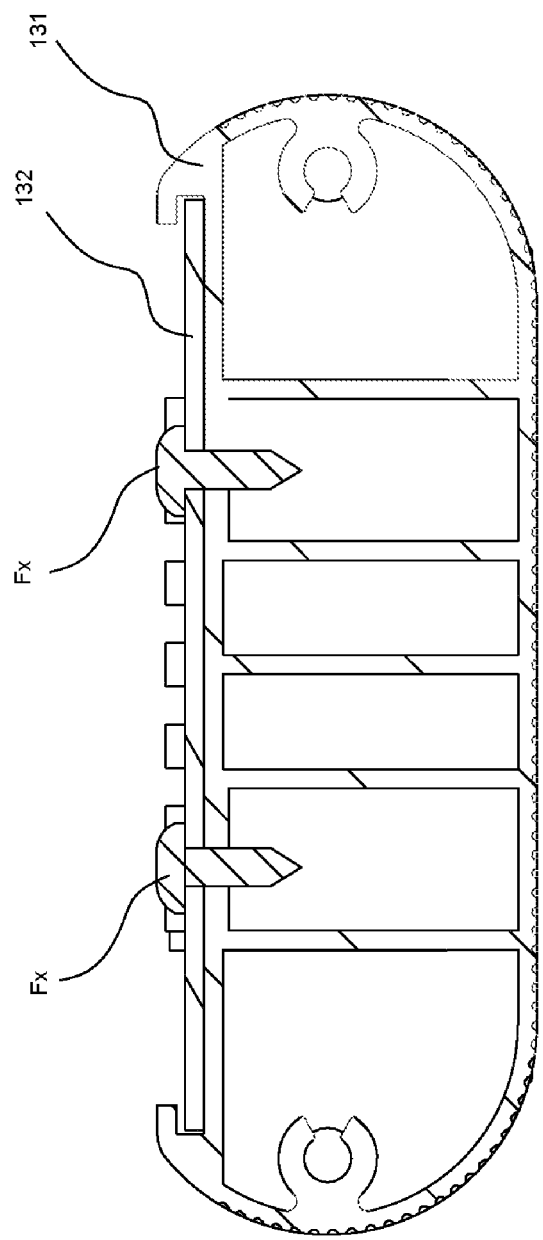
FIG. 4 is a first sectional view of the modularized lighting device in accordance with one embodiment of the present invention.
Figure 5:
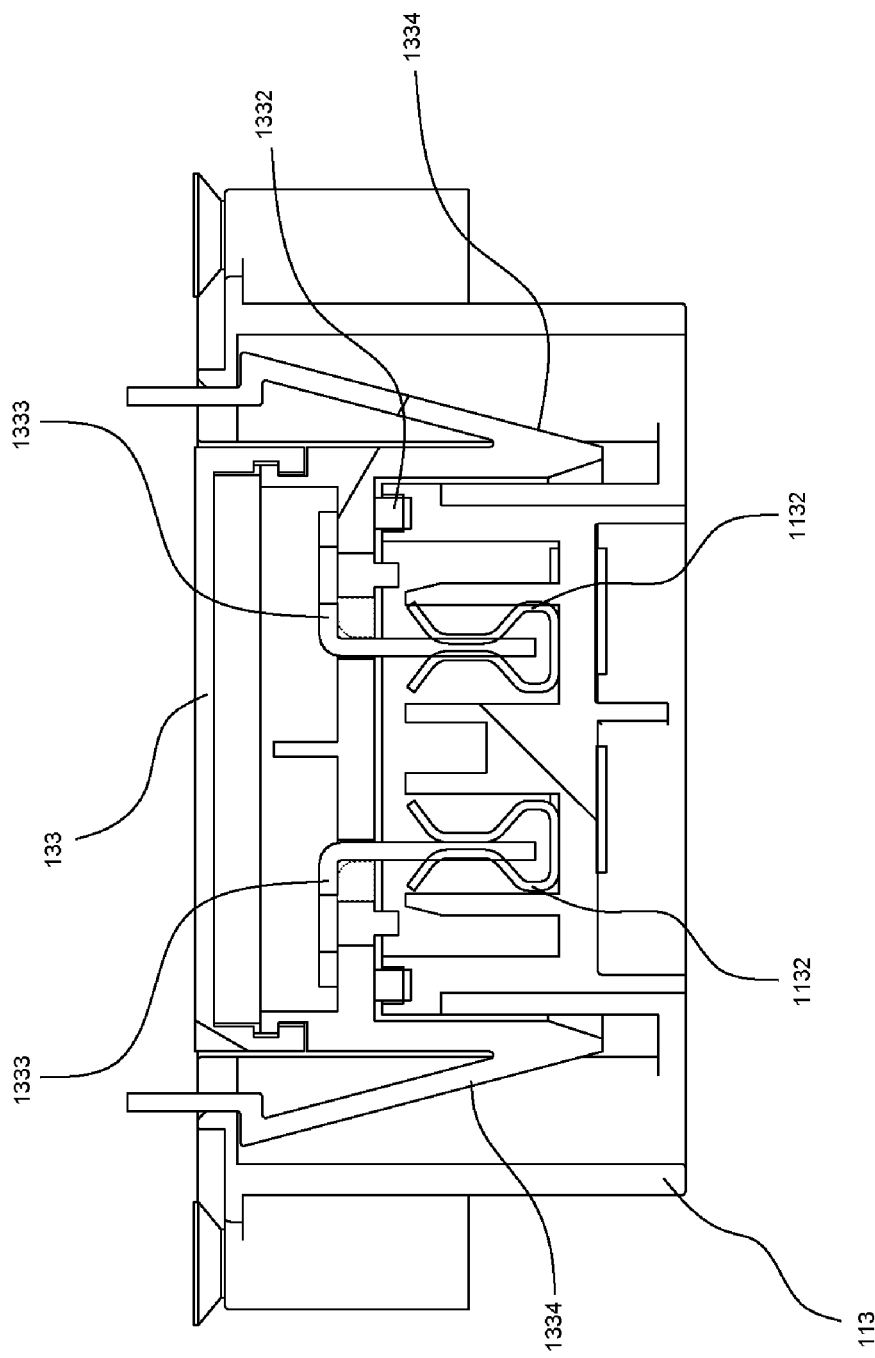
FIG. 5 is a second sectional view of the modularized lighting device in accordance with one embodiment of the present invention.

Please refer to FIG. 4 and FIG. 5, which are a first sectional view and a second sectional view of the modularized lighting device in accordance with one embodiment of the present invention; please also refer to FIG. 1~FIG. 3. As shown in FIG. 4, the light source board 132 is disposed in the housing 131 and fixed on the housing 131 via a plurality of fixation members Fx.

As shown in FIG. 5, the two connecting sheets 1333 of the end cap 133 are respectively inserted into the two clamping structures 1132 of the electrical connecting module 113. The clamping structures 1132 may be made of a material with great elasticity and electrical conductivity (e.g., aluminum, copper, phosphor bronze or other metal materials), such that the clamping structures 1132 can have great elasticity and electrical conductivity. In this way, the clamping structures 1132 can provide proper clamping force for the connecting sheets 1333.

The embodiment just exemplifies the present invention and is not intended to limit the scope of the present invention; any equivalent modification and variation according to the spirit of the present invention is to be also included within the scope of the following claims and their equivalents.

Figure 6:
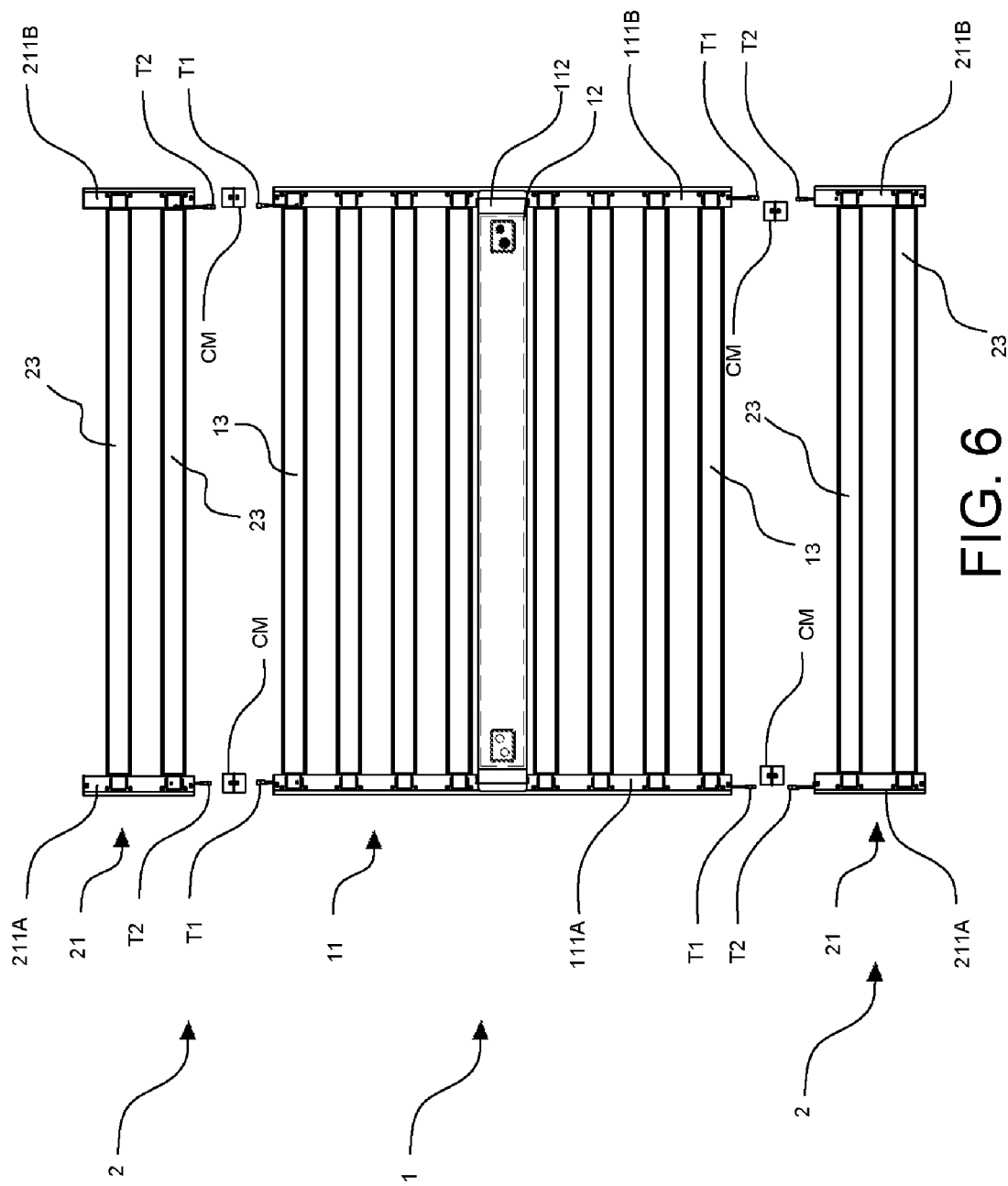
FIG. 6 is a top view of a modularized lighting device in accordance with another embodiment of the present invention.
Figure 7:
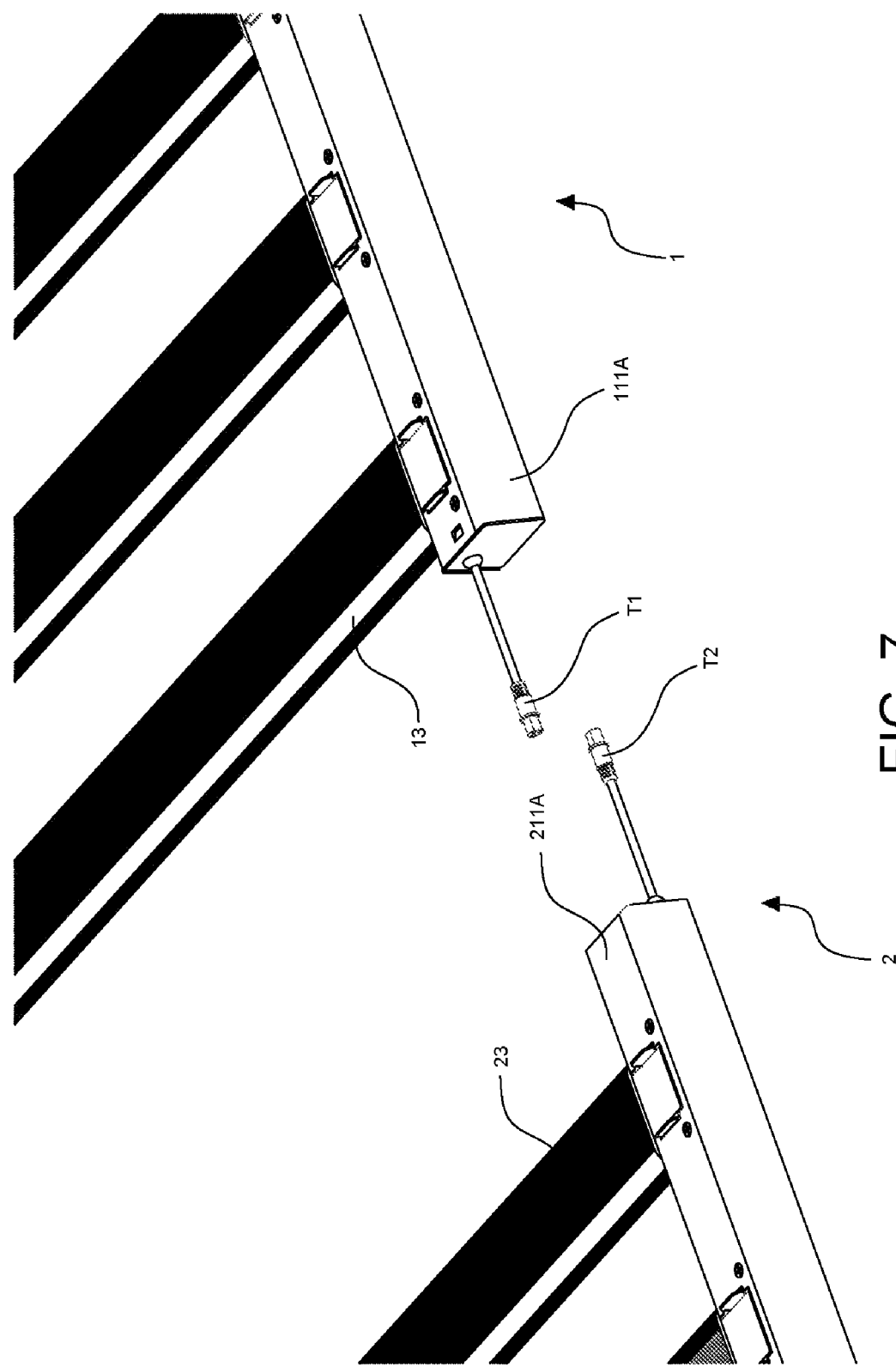
FIG. 7 is a partial enlargement view of the modularized lighting device in accordance with another embodiment of the present invention.

Please refer to FIG. 6 and FIG. 7, which are a top view and a partial enlargement view of a modularized lighting device in accordance with another embodiment of the present invention respectively. As shown in FIG. 6 and FIG. 7, the difference between the embodiment and the previous embodiment are that the modularized lighting device 1 further include a plurality of connecting terminals T1 and a plurality of connecting members CM. The connecting terminals T1 can be electrically connected to the power source module 12 of the modularized lighting device 1. The modularized lighting device 1 can be connected to one or more extension lighting devices 2. The extension lighting device 1 also includes a fixation frame 21, a plurality of light source modules 23 and a plurality of connecting terminals T2. The structure of the lighting source module 23 is the same with that of the light source module 13, and thus the details thereabout would be omitted herein. The fixation frame 21 includes a first fixation frame bar 211A and a second fixation frame bar 211B. The above connecting terminals T2 are electrically connected to the light source modules 23. The number of the light source modules 23 can be changed according to actual requirements. The connection structure of the fixation frame 21 and the light source modules 23 of the extension lighting device 2 are the same with that of the modularized lighting device 1, and thus the details thereabout would be omitted herein.

The above connecting terminals T1 are electrically connected to the connecting terminals T2 respectively, such that the light source modules 23 can be electrically connected to the power source module 12. In the embodiment, the connecting terminals T1 may be male connectors and the connecting terminals T2 may be female connectors. In another embodiment, the connecting terminals T1 may be female connectors and the connecting terminals T2 may be male connectors.

The frame 11 of the modularized lighting device 1 can be fixed to the frames 21 of the extension lighting device 2 with each other via the above connecting members CM. The connecting terminal T1 and the connecting terminal T2 connected to each other are disposed in the connecting member CM corresponding thereto.

Via the above expandable structure, the user can connect one or more extension lighting devices to the modularized lighting device 1 according to actual requirements so as to increase the number of the light source modules. In this way, the illumination and the lighting range of the modularized lighting device 1 can meet the requirements of the user. Therefore, the modularized lighting device 1 can be more flexible in use and more comprehensive in application.

The embodiment just exemplifies the present invention and is not intended to limit the scope of the present invention; any equivalent modification and variation according to the spirit of the present invention is to be also included within the scope of the following claims and their equivalents.

It is worthy to point out that most of currently available lighting products are integrated-type lighting devices. If a currently available lighting device malfunctions, it is necessary to replace the lighting device by another one or remove lighting device for repairing. For the same reason, the transportation cost and storage cost of these lighting devices cannot be effectively reduced. On the contrary, according to one embodiment of the present invention, the modularized lighting device has the modularized light source module and the modularized electrical connecting module. Thus, if any one of the light source modules or any one of the electrical connecting module malfunctions, the user can directly remove the light source module or electrical connecting module for maintenance or repairing, which can significantly reduce the maintenance cost.

Also, according to one embodiment of the present invention, the modularized lighting device has the modularized light source module and the modularized electrical connecting module. Therefore, the modularized lighting device is not only convenient in transportation, but also can effectively save more storage space, which can greatly reduce the transportation cost and storage cost thereof.

Besides, according to one embodiment of the present invention, the modularized lighting device has the expandable structure, so the user can increase the number of the lighting source modules via the expandable structure according to actual requirements. Therefore, the luminance and the lighting range of the modularized lighting device can satisfy the requirements of the user. Therefore, the modularized lighting device can be more flexible in use and more comprehensive in application.

Moreover, according to one embodiment of the present invention, the structure design of the modularized lighting device is simple, so the modularized lighting device can achieve the desired technical effects without significantly increasing the cost thereof. Thus, the modularized lighting device can have high commercial value. As described above, the modularized lighting device according to the embodiments of the present invention can definitely achieve great technical effects.

Figure 8:
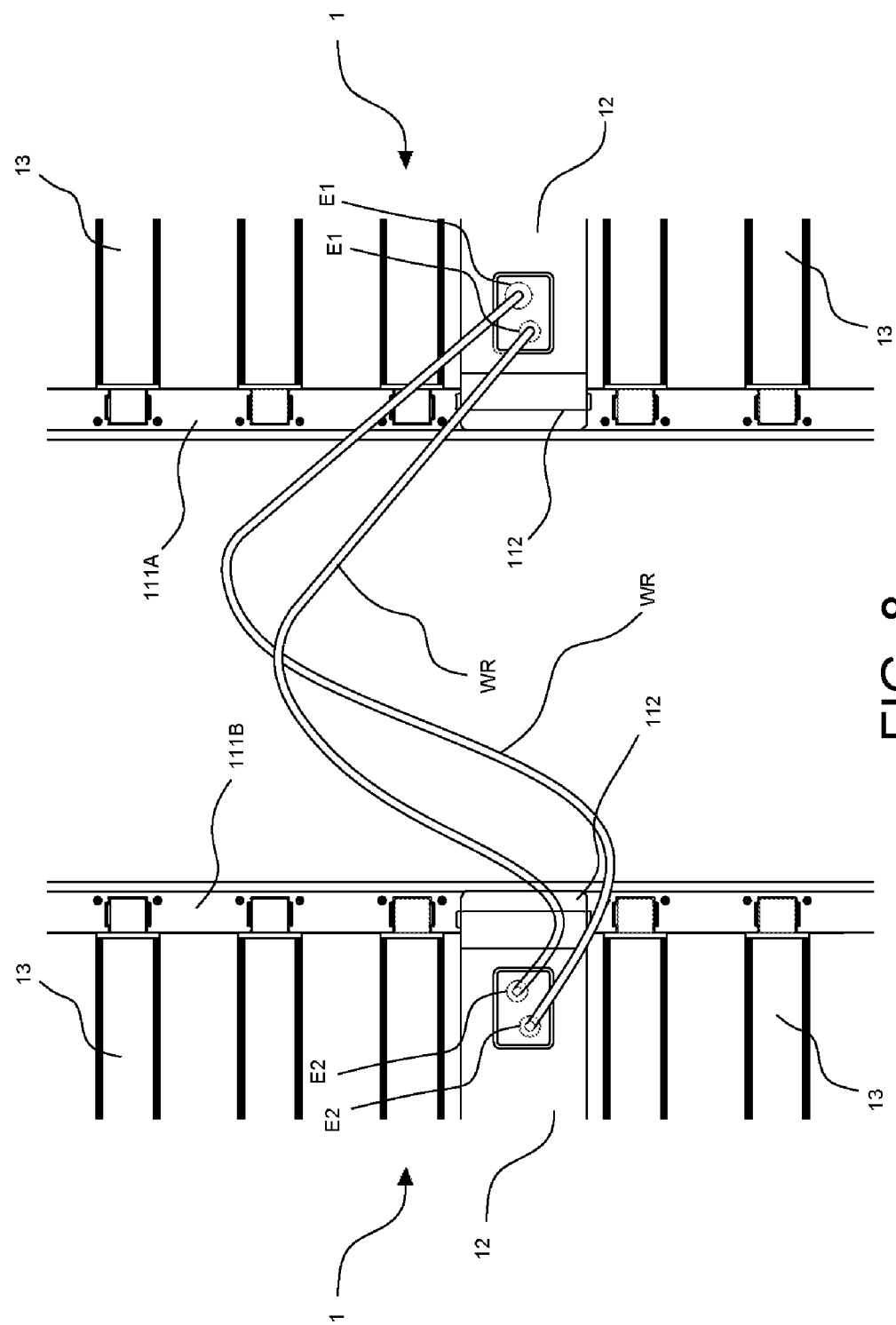
FIG. 8 is a top view of a modularized lighting device in accordance with still another embodiment of the present invention.

Please refer to FIG. 8, which is a top view of a modularized lighting device in accordance with still another embodiment of the present invention; please also refer to FIG. 3. As shown in FIG. 8, the power source module 12 of each modularized lighting device 1 further includes two first connectors E1, two second connectors E2 and two connecting wires WR. The two first connectors E1 of the power source module 12 of one modularized lighting device 1 can be electrically connected to the two second connectors E2 of the power source module 12 of another modularized lighting device 1 via the two connecting wires WR. In one embodiment, the first connectors E1 may be male connectors and the second connectors E2 may be female connectors. In another embodiment, the first connectors E1 may be female connectors and the second connectors E2 may be male connectors. The above structure can further enhance the scalability of the modularized lighting device 1 with an eye to meeting actual requirements.

The embodiment just exemplifies the present invention and is not intended to limit the scope of the present invention; any equivalent modification and variation according to the spirit of the present invention is to be also included within the scope of the following claims and their equivalents.

Figure 9:
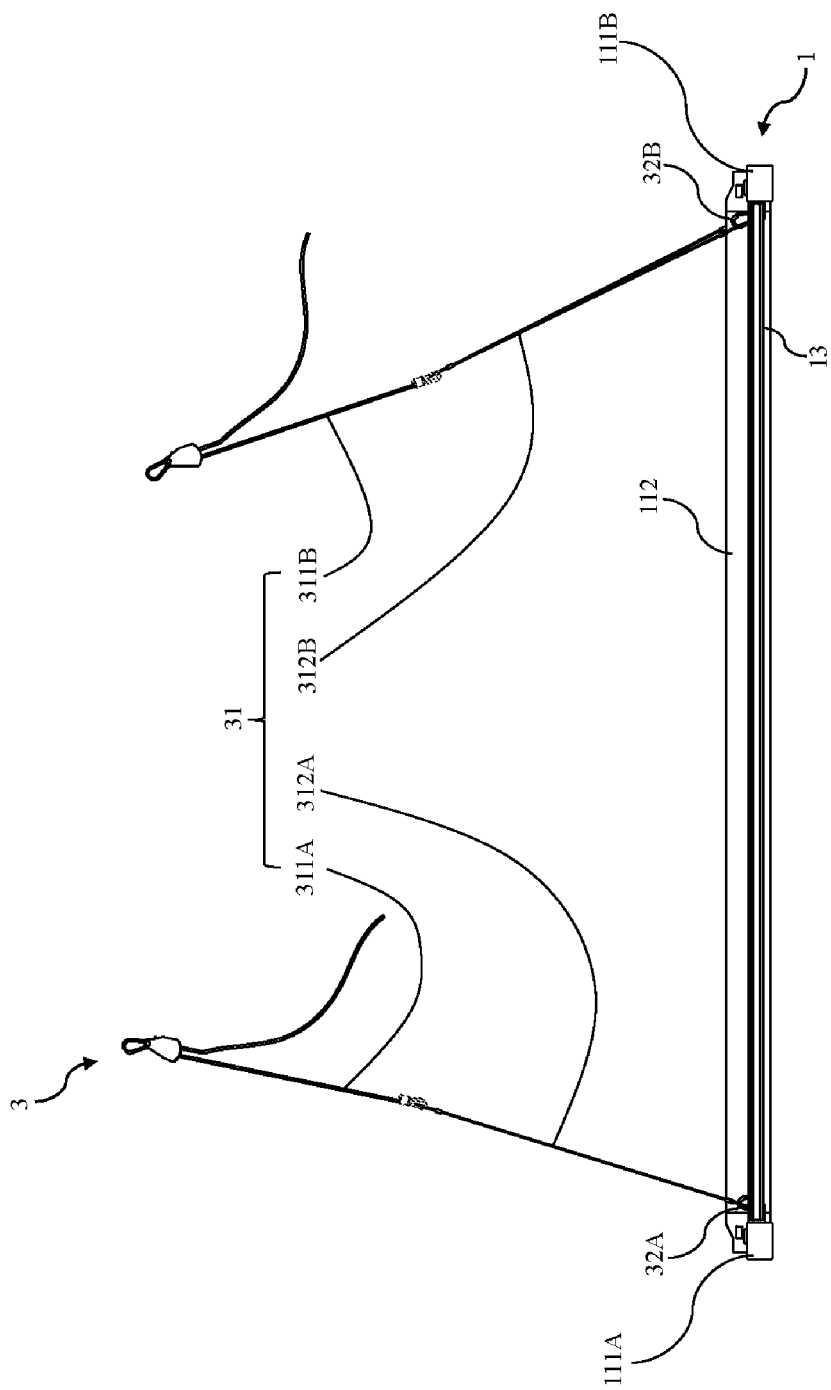
FIG. 9 is a side view of a modularized lighting device in accordance with still another embodiment of the present invention.

FIG. 9 is a side view of a modularized lighting device in accordance with still another embodiment of the present invention; please also refer to FIG. 3. As shown in FIG. 9, the modularized lighting device 1 further includes a hanging structure 3. The hanging structure 3 includes a retractable structure 31, two first hanging rings 32A and two second hanging rings 32B.

The retractable structure 31 includes a first adjusting rope 311A, a second adjusting rope 311B, a first balance rope 312A and a second balance rope 312B. The first adjusting rope 311A is connected to the two first hanging rings 32A via the first balance rope 312A. The second adjusting rope 311B is connected to the two second hanging rings 32B via the second balance rope 312B. In one embodiment, the first balance rope 312A and the second balance rope 312B are made of a metal material (e.g., wire rope). The user can adjust the lengths of the first adjusting rope 311A and the second adjusting rope 311B.

As shown in FIG. 9, the two first hanging rings 32A are fixed at the first frame bar 111A and the two second hanging rings 32B are fixed at the second frame bar 111B. In addition, the distance between the two first hanging rings 32A is substantially equal to ⅔ of the length of the first frame bar 111A. Similarly, the distance between the two second hanging rings 32B is substantially equal to ⅔ of the length of the second frame bar 111B. The above structure design can effectively avoid that the frame 11 is deformed due to the external force applied by the hanging structure 3, which can greatly enhance the structural stability of the modularized lighting device 1 and extend the service life thereof.

As described above, as the modularized lighting device 1 has the adjustable hanging structure 3, the distance between the modularized lighting device 1 and the ground is adjustable. Thus, the user can adjust the distance between the modularized lighting device 1 and the ground according to actual requirements. For instance, the user can dynamically adjust the modularized lighting device 1 and the plant according to the growth period of the plant in order to effectively promote the growth of the plant. Accordingly, the modularized lighting device 1 can satisfy the requirements of indoor agriculture (plant growth light) or other different applications. Accordingly, the modularized lighting device 1 can be more comprehensive in application, and more convenient and flexible in use.

The embodiment just exemplifies the present invention and is not intended to limit the scope of the present invention; any equivalent modification and variation according to the spirit of the present invention is to be also included within the scope of the following claims and their equivalents.

To sum up, according to one embodiment of the present invention, the modularized lighting device has the modularized light source module and the modularized electrical connecting module. Thus, if any one of the light source modules or any one of the electrical connecting module malfunctions, the user can directly remove the light source module or electrical connecting module for maintenance or repairing, which can significantly reduce the maintenance cost.

Also, according to one embodiment of the present invention, the modularized lighting device has the modularized light source module and the modularized electrical connecting module. Therefore, the modularized lighting device is not only convenient in transportation, but also can effectively save more storage space, which can greatly reduce the transportation cost and storage cost thereof.

Moreover, according to one embodiment of the present invention, the modularized lighting device has the expandable structure, so the user can increase the number of the lighting source modules via the expandable structure according to actual requirements. Therefore, the luminance and the lighting range of the modularized lighting device can satisfy the requirements of the user. Therefore, the modularized lighting device can be more flexible in use and more comprehensive in application.

Further, according to one embodiment of the present invention, the structure design of the modularized lighting device is simple, so the modularized lighting device can achieve the desired technical effects without significantly increasing the cost thereof. Thus, the modularized lighting device can have high commercial value.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A modularized lighting device, comprising:
    a light source module comprising a housing, two end caps disposed at two ends of the housing respectively and a light source board disposed in the housing, wherein each of the end caps comprises a base having an accommodating space, two snapping mechanisms disposed at two sides of the base respectively and two connecting sheets fixed at a bottom of the accommodating space, and the two connecting sheets are electrically connected to the light source board via the base; and
    a frame comprising two electrical connecting modules, wherein each of the electrical connecting modules comprises an installation base having an installation space and two clamping structures disposed at a bottom of the installation space, and the light source module is disposed in the frame and electrically connected to the two clamping structures of each of the electrical connecting modules, wherein each of the end caps is detachably installed on the electrical connecting module corresponding thereto via the two snapping mechanisms;
    wherein the two end caps are detachably installed at the two electrical connecting modules respectively, whereby the two connecting sheets of each of the end caps are inserted into the two clamping structures of the electrical connecting module corresponding thereto.

2. The modularized lighting device as claimed in claim 1, wherein each of the end caps further comprises a waterproof ring disposed at the bottom of the accommodating space and surrounds the two connecting sheets.

3. The modularized lighting device as claimed in claim 1, wherein the light source board comprises a circuit board and a plurality of light emitting units disposed on the circuit board.

4. The modularized lighting device as claimed in claim 3, wherein the light emitting units are light-emitting diodes.

5. The modularized lighting device as claimed in claim 1, wherein the frame further comprises a first frame bar, a second frame bar and a connecting portion, wherein the first frame bar is connected to the second frame bar via the connecting portion, and the two electrical connecting modules are disposed on the first frame bar and the second frame bar respectively.

6. The modularized lighting device as claimed in claim 5, further comprising a power source module disposed in the connecting portion and electrically connected to the clamping structures of each of the electrical connecting modules.

7. The modularized lighting device as claimed in claim 5, further comprising a hanging structure having a retractable structure, two first hanging rings fixed on the first frame bar and two second hanging rings fixed on the second frame bar, wherein the retractable structure is connected to the two first hanging rings and the two second hanging rings.

\* \* \* \* \*